April 23, 1929.　　　C. LLEWELLYN　　　1,710,265
PNEUMATIC WHEEL FOR VEHICLES
Filed Oct. 2, 1926
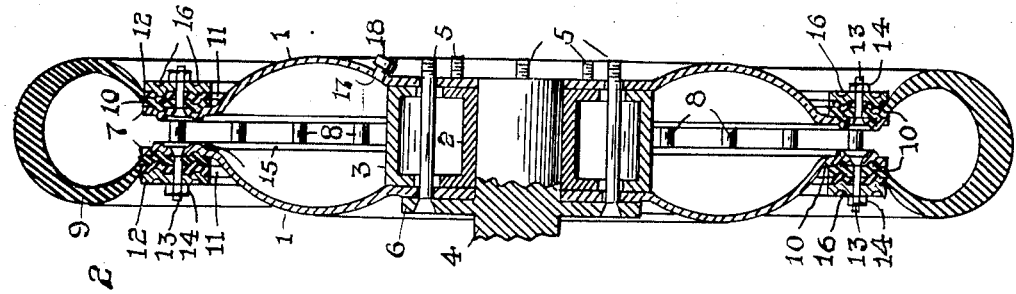
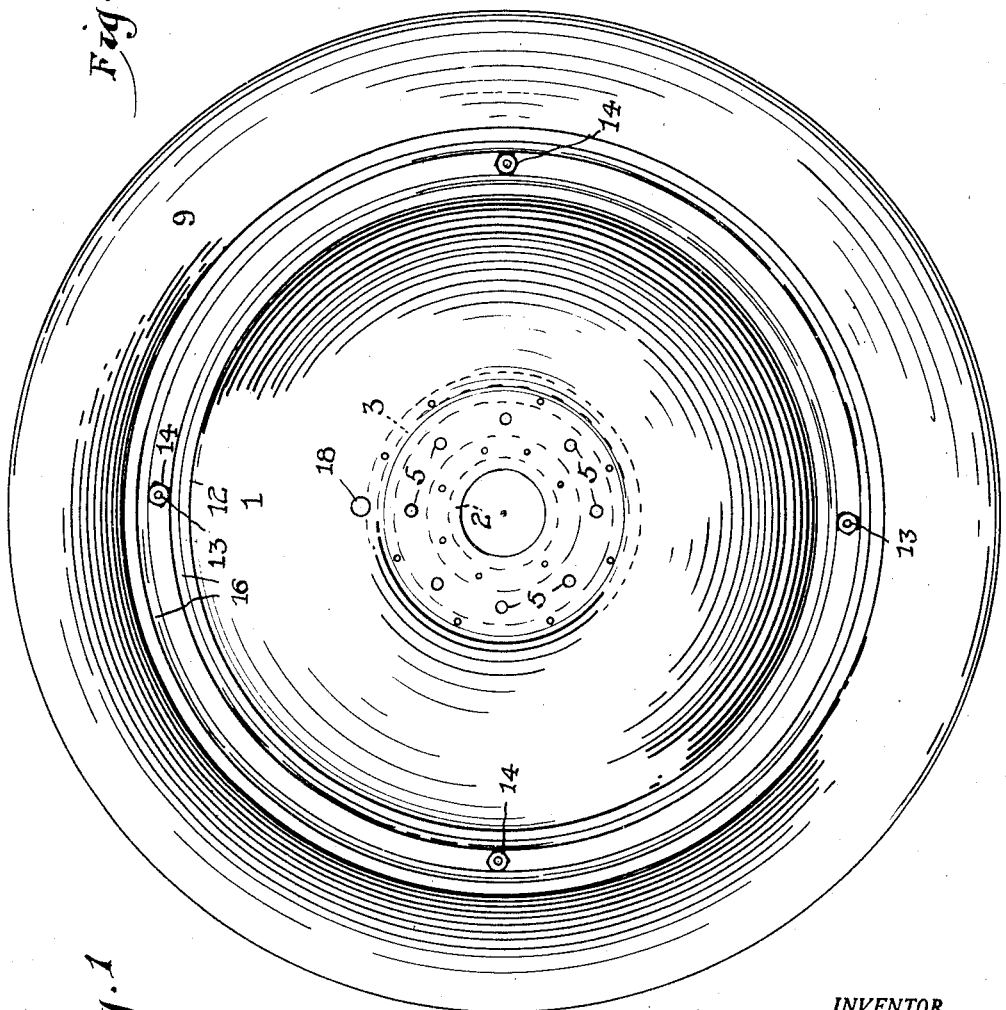
INVENTOR.
Chandler Llewellyn
BY Edward A. Laurence
his ATTORNEY Patented Apr. 23, 1929.

1,710,265

UNITED STATES PATENT OFFICE.

CHANDLER LLEWELLYN, OF BUFFALO TOWNSHIP, BUTLER COUNTY, PENNSYLVANIA.

PNEUMATIC WHEEL FOR VEHICLES.

Application filed October 2, 1926. Serial No. 139,084.

Motor vehicles are commonly provided with pneumatic tires comprising a shoe mounted on a steel rim and containing an inflated inner tube. Formerly the cross sectional area of the tire was relatively small and pressures up to 65 and 70 pounds were employed. The result was that the impacts of the tire on the road surface were largely transferred to the rim, causing discomfort to the occupants of the vehicle and injury to its mechanism.

Modern practice shows larger cross sectional areas for the tires and reduced pressures as for instance "balloon tires", and pressures of 30 or 40 pounds, or less.

While balloon tires reduce the jarring and jolting of road travel, the impacts are still transferred to a large extent to the rims and thence to the vehicle.

The object which I have in view is to materially reduce such impact, and I accomplish this purpose by employing the interior of the wheel as a part of the pneumatic chamber of the tire, thus greatly enlarging the air cushion and thus minimizing the effect of the jolts and jars.

I accomplish this purpose by the use of a hollow wheel whose interior chamber is open to the interior of the tire.

Thus I prefer to form the wheel of two spaced apart disks which include between them an air chamber with the tire mounted on the outer edges of said disks and bridging the space between them, so that the interior of the wheel and the interior of the tire coact to provide an air cushion of many times greater capacity than that hitherto possible.

By this means I am able to practically eliminate the possibility of jolting or jarring the passengers or the vehicle mechanism.

Other novel features of construction and also of arrangement of parts will appear from the following description.

In the accompanying drawings wherein I have illustrated the best embodiment of the principles of my invention now known to me, Fig. 1 is an elevation of a motor vehicle wheel and Fig. 2 is a diametric section of the same.

Referring to the drawings, 1 represents a pair of metal disks of circular form and provided with axial openings of circular shape and alined with each other. 2 is a cylindrical hub sleeve having flanged ends which is interposed between the centers of the disks and has its ends riveted and welded or otherwise rigidly and permanently secured to the disks. Concentric with the hub sleeve 2 is a second and similar sleeve 3 but of larger diameter having its flanged ends also attached to the disks, the joint being permanent and air-tight as by riveting and welding.

4 represents the axle assemblage on which the wheel is mounted and to which the wheel is detachably secured as by means of the stud bolts 5 fixed to the flange 6 of the axle assemblage and extending through registering holes in the disks between the sleeves 2 and 3.

The outer edges of the disks are formed by parallel walls 7 and the disks are preferably braced into fixed relation with each other as by means of spacer members 8 interposed between the walls 7 and welded or otherwise secured to the disks. The spacers 8 are spaced apart so as not to block the air chamber.

The tire comprises a shoe 9 which may be similar to the shoe of a conventional pneumatic tire, but which has its free edges formed as parallel walls 10 which fit against the outer surfaces of the walls 7 of the wheel.

11 represents compressible gaskets of annular form which fit against the outer surfaces of the walls 10 of the shoe 9, and against the outer surfaces of the gaskets 11 are fitted the flat metal annuli 12.

13 are stud bolts fixed to the walls 7 of the wheel and extending outwardly through registering holes in the walls 10 of the shoe 9 and also through the gaskets 11 and the annuli 12.

14 are nuts screwed up on said bolts to clamp the tire to the wheel with air-tight joints.

I prefer to provide the outer faces of the walls 7 of the disks 1 and 2 with an annular groove or grooves 15 concentric with the wheel, and to provide the metal annuli 12 with similar ribs 16 on their inner faces so as to kink or compress the material of the walls 10 of the shoe into the grooves 15 of the wheel.

I provide the wheel with an air inlet 17 provided with the usual check valve 18 for the introduction of compressed air into the interior of the wheel.

When the wheel is to be inflated, air to the proper pressure is pumped through the inlet 17, inflating the shoe and also establishing the same pressure in the interior of the wheel, thereby providing an air cushion for the vehicle including the interior of the shoe and extending to the sleeve 3.

The capacity of the air chamber may be advantageously enlarged by curving the disks 1 and 2 outwardly from each other between their hub portions and their perimeters.

It is apparent that I thus obtain a much larger air chamber or pneumatic cushion than is possible with the wheels and tires now in general use, and I thus practically eliminate the transference of jolts and jars to the vehicle.

My improved pneumatic wheel is of simple and inexpensive construction, and the character of tire required therefor is much more simple and much less expensive than the standard tires and tubes now in general use.

What I desire to claim is:—

In a wheel body comprising two disks spaced apart at their rim portions, said rim portions being grooved on their outer faces for the reception thereat of the free edges of a tire shoe, annular gaskets also grooved and fitting against the outer faces of said tire shoe at its inner periphery, metallic annuli provided with ribs and formed to fit against the outer faces of said gaskets, and nutted bolts each provided with a spacing member at its intermediate portion to space said disks at their rim portions and each passing through said disks, tire shoe, gaskets and annuli and adapted to clamp the same in operative position.

Signed at Pittsburgh, Pa., this 24th day of September, 1926.

CHANDLER LLEWELLYN.